United States Patent
Breitlow et al.

(10) Patent No.: US 7,132,822 B1
(45) Date of Patent: Nov. 7, 2006

(54) MULTI-PROCESSOR RESTART STABILIZATION SYSTEM AND METHOD

(75) Inventors: Stanton Hopkins Breitlow, Winona, MN (US); Philip Steven Schmidt, Lanesboro, MN (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

(21) Appl. No.: 11/364,968

(22) Filed: Feb. 28, 2006

(51) Int. Cl.
  *G01R 11/32* (2006.01)
  *G01R 31/28* (2006.01)
(52) U.S. Cl. ................................................. 324/142
(58) Field of Classification Search ............... None
  See application file for complete search history.

(56) References Cited

U.S. PATENT DOCUMENTS

| | | | |
|---|---|---|---|
| 5,095,438 A | 3/1992 | Sasaki | |
| 5,203,000 A | 4/1993 | Folkes et al. | |
| 5,212,797 A | 5/1993 | Miyake et al. | |
| 5,317,752 A | 5/1994 | Jewett et al. | |
| 5,408,648 A | 4/1995 | Gokan et al. | |
| 5,579,524 A | 11/1996 | Kikinis | |
| 5,664,089 A | 9/1997 | Byers et al. | |
| 5,696,979 A | 12/1997 | Saitou | |
| 5,761,406 A | 6/1998 | Kobayashi et al. | |
| 5,767,647 A | 6/1998 | Akiyama et al. | |
| 6,069,833 A | 5/2000 | Koura | |
| 6,119,064 A | 9/2000 | Nakaguro et al. | |
| 6,249,739 B1 | 6/2001 | Nochring et al. | |
| 6,367,022 B1 | 4/2002 | Gillespie et al. | |
| 6,393,573 B1 | 5/2002 | Gillespie et al. | |
| 6,601,176 B1 | 7/2003 | Alexander et al. | |
| 6,690,178 B1 * | 2/2004 | Harris et al. | 324/649 |
| 6,925,616 B1 * | 8/2005 | Noujeim et al. | 716/4 |
| 6,944,779 B1 | 9/2005 | Alexander et al. | |

* cited by examiner

*Primary Examiner*—Jermele Hollington
*Assistant Examiner*—Trung Q. Nguyen
(74) *Attorney, Agent, or Firm*—Harness, Dickey & Pierce P.L.C.

(57) ABSTRACT

A supervisory system and method including a voltage detection circuit, a status signal interface, a memory, and a supervisory processor configured to predict a pending low power condition, to save status parameters, and to take actions to manage a plurality of processors receiving power from a power source susceptible to low voltage conditions, to stabilize the processors prior to and during a low voltage condition, and to restart the processors based on the status parameters.

34 Claims, 5 Drawing Sheets

MULTI-PROCESSOR RESTART STABILIZATION SYSTEM AND METHOD

FIELD

The present disclosure relates in general to methods and systems for managing a plurality of processors in an electrical system and, more specifically, for managing the processors before, during and after a low voltage condition.

BACKGROUND

The statements in this section merely provide background information related to the present disclosure and may not constitute prior art.

The continuous reductions in microprocessor size and cost and associated increases in processing speed have facilitated the proliferation of multiple processors within electronic systems, wherein each microprocessor is responsible for controlling and managing an operation of a specific electronic device and/or specific functions within an electronic device. Reduced processor power requirements further facilitates cost reductions in the power supplies that power multiple electronic systems, permitting multiple processors to share a single power supply.

With a shared/common power source, such as a DC battery power source, supplying power to multiple system components, power management can become an issue when one system component can place such a demand for power (e.g., such as starting or powering a compressor, a fan, a pump, or a motor), that the demand reduces the voltage of the power received by other system components. While such increased power demand from a single system component may be temporary, it can cause other system components that are managed by individual central processor units (CPUs) to malfunction when the voltage is temporarily reduced. The reduced voltage available to a processor controlling another electronic component can be below a minimum operating threshold voltage, causing the processor and the device/process it controls to malfunction.

Generally, power systems or processors are configured to reset a processor or to place the processor in a standby mode if the incoming voltage level falls below the minimum power threshold level. When a reset occurs, the processor loses the current status of its operation and the components it manages/controls must undergo a cold start-up process, similar to re-booting a computer after power failure. However, in the past, such system reboots have caused significant drain on the common power source when one or more processors, power loads or system attempt to reboot at the same time or in the wrong order. Additionally, often each of the components does not have prior knowledge of the low voltage condition. As such, each is forced to hard reboot when the power is insufficient to continue the normal operation of the system.

SUMMARY

The inventor hereof has succeeded at designing power control systems that are capable of managing the power to a plurality of processors before, during and after a low voltage condition. This can include predicting a pending low voltage condition before it actually occurs, and taking several actions to soften the low voltage condition and to aid in the recovery of the processors following recovery of the voltage to an operating level. Various embodiments as described in this disclosure provide improvements over existing systems and can include reductions in power required during recovery, reduced recovery time to a status or state of the system as before the low voltage condition, and improved accuracy or correctness of the recovery of each and every processor within the electronic system. Additional benefits of some embodiments can also include safe and efficient method of controlling a plurality of processors coupled to a common power line that is susceptible of low voltage conditions.

According to one aspect, a supervisory system for stabilizing an electronic system having a plurality of operational processors receiving power from a DC power source and a power load consuming a portion of the power from the power source and capable of reducing the voltage of the power received by the processors, the system including a supervisory processing module configured for performing supervisory operations including receiving a monitored voltage of the power received from the power source, predicting a low voltage condition of the power received from the power source, receiving one or more status signals including one or more status parameters of at least one of the electronic system and a processor within the electronic system, storing the one or more received status parameters, identifying an operating voltage recovery condition indicated by an increase in the monitored voltage level being greater than a minimum operational processor voltage level following the detection of the low voltage condition, and transmitting to each of one or more operational processors a recovery signal including one or more of the stored status parameters in response to identifying the operating voltage recovery condition, the low voltage condition defined as a voltage level less than the minimum operational processor voltage level.

According to another aspect, a system for controlling multiple processors in an electronic system having a DC power source for providing DC power to the processors and to power loads within the electronic system includes a plurality of processors and a supervisory system. Each processor is configured for performing an operation associated with the electronic system and receiving a portion of the power provided by the power source. The processor is also configured for performing the operation and for generating a status signal with a status parameter indicative of a status of the processor when the voltage of the receiving power is greater than a minimal operational processor voltage level. The supervisory system is configured for receiving a portion of the power provided by the power source and receiving a system status signal including a system status parameter. The supervisory system is also configured for performing a supervisory operation including monitoring a level of the voltage of the received power, receiving the status signal from one or more of the processors, predicting a pending low voltage condition having a voltage level equal to or less than the minimal operational processor voltage level, storing one or more received status parameters, detecting a low voltage condition having a received voltage equal to or less than the minimal operational processor voltage level, detecting a voltage level greater than the minimal operational processor voltage level following the detection of the low voltage condition, and transmitting to one or more operational processors a recovery signal including at least one of one or more stored status parameters and a system status parameter in response to the detected voltage level being greater than the minimal operational processor voltage level. The supervisory system is configured for performing the supervisory operations when the voltage received from the power source is greater than a minimum supervisory voltage level and wherein the minimum supervisory voltage level is less than the minimal operational processor voltage level.

According to yet another aspect, a system for managing an electronic system having a DC power source providing power to a plurality of operational processors, at least one supervisory system including a supervisory processor, and power loads, includes means for predicting a low voltage condition, the low voltage condition being when the voltage of the received power from the supply power is equal to or less than a predetermined value, means for receiving a status signal including a status parameter associated with a status of at least one of the electronic system, one or more operational processors, and one or more supervisory processors, and means for storing by each supervisory system a status parameter associated with at least one of the electronic system, one or more operational processors, and one or more supervisory processors. The system also includes means for operating each of the supervisory systems following a reduction of voltage received from the power source of equal to or less than the predetermined value. The system further includes means for detecting the voltage received from the power source is greater than the predetermined value following the low voltage condition and means for restarting each of the operational processors in response to the detecting of the voltage from the power source being greater than the predetermined value by the means for detecting, wherein restarting includes restarting each operational processor in response to one or more stored status parameters.

According to still another aspect, a method of controlling multiple processors in an electronic system wherein each of the multiple processors receiving operating power from a DC power source includes monitoring a voltage received from the power source, predicting a reduction of the voltage to a level less than a predetermined value before the voltage equals the predetermined value, and storing a status parameter associated with at least one of status of one or more of the processors and a status of the system. The method also includes monitoring the voltage received from the power source following a reduction of the received power source voltage to a level less than the first predetermined value, detecting an increase in the voltage received from the power source to a level greater than the first predetermined value, and transmitting a recovery signal to each of the one or more of the multiple processors, each recovery signal including one or more of the stored status parameters.

Further aspects of the present disclosure and teachings will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

Figure 1:
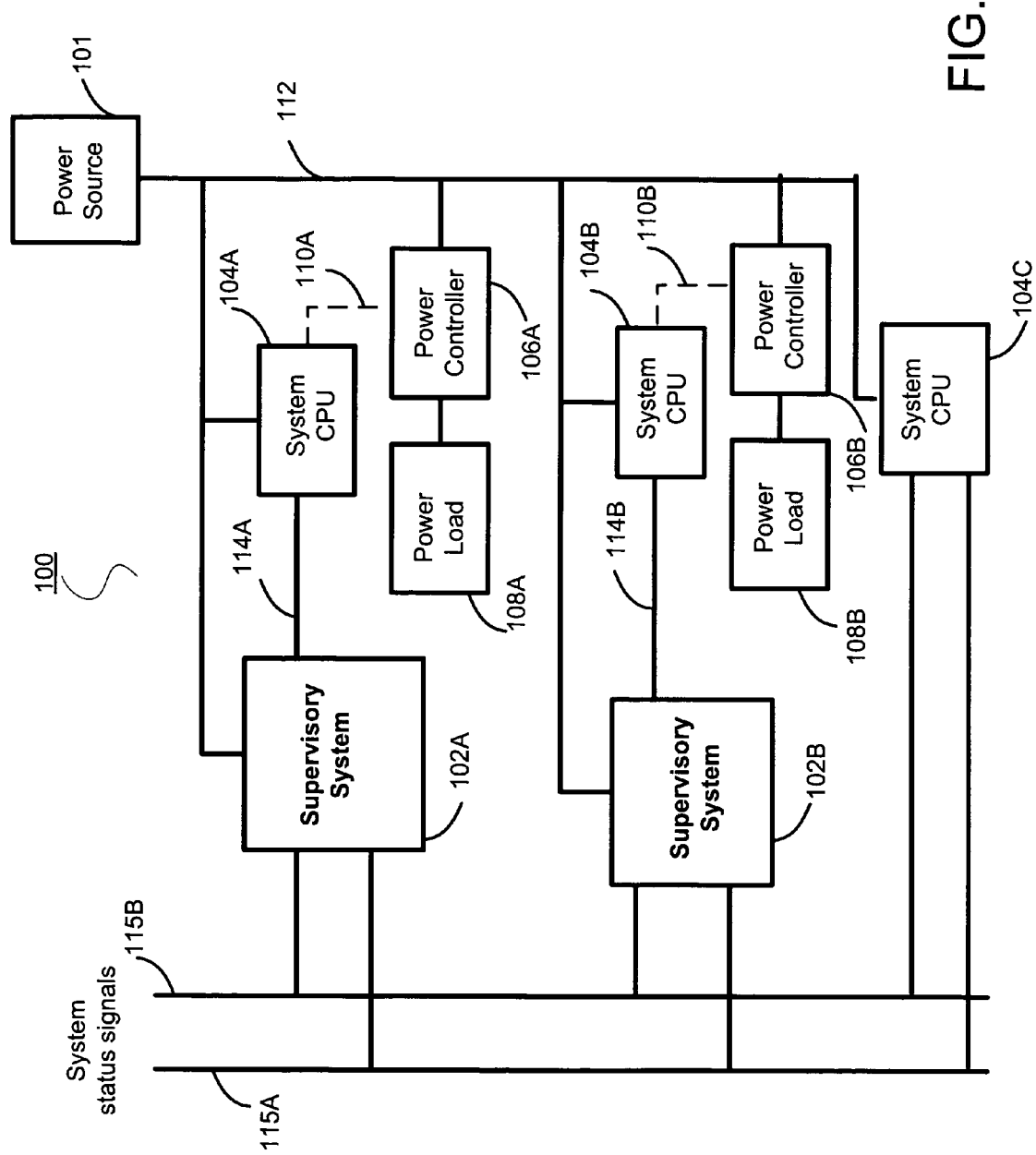
FIG. 1 is block diagram of a multi-processor power management system according in one exemplary embodiment.

The following description is merely exemplary in nature and is not intended to limit the present disclosure or the disclosure's applications or uses.

According to some embodiments, a system is configured for controlling multiple processors in an electronic system having a DC power source for providing DC power to the processors and to power loads within the electronic system that includes a plurality of processors and a supervisory system. Each processor is configured for performing an operation associated with the electronic system and receiving a portion of the power provided by the power source. Each processor is also configured for performing the operation and for generating a status signal with a status parameter indicative of a status of the processor on a periodic, continuous or changed status basis and when the voltage of the receiving power is greater than a minimal operational processor voltage level. The status can be any system or processor status including, but not limited to, an identification of a unit such as a processor as a master, a slave, or a peer, a signal, a characteristic or parameter value, a hierarchical position within an organization of components, a state within a processor or process flow or state table, including an on/off state, or a turning on or turning off state, a position, and a profile. For example, one or more of the processors can be a master processor, a slave processor, or a peer processor, an operational processor or a supervisory processor. In such cases, each can generate a status signal that includes an indication of its status as a master, slave or peer operational or supervisory processor.

The supervisory system is further configured for receiving a portion of the power provided by the power source and receiving a system status signal including a system status parameter. The supervisory system is also configured for performing a supervisory operation including monitoring a level of the voltage of the received power, receiving the status signal from one or more of the processors, predicting a pending low voltage condition having a voltage level equal to or less than the minimal operational processor voltage level, storing one or more received status parameters, detecting a low voltage condition having a received voltage equal to or less than the minimal operational processor voltage level, detecting a voltage level greater than the minimal operational processor voltage level following the detection of the low voltage condition, and transmitting to one or more operational processors a recovery signal including at least one of one or more stored status parameters and a system status parameter in response to the detected voltage level being greater than the minimal operational processor voltage level. The supervisory system is configured for performing the supervisory operations when the voltage received from the power source is greater than a minimum supervisory voltage level and wherein the minimum supervisory voltage level is less than the minimal operational processor voltage level.

In some embodiments, the supervisory system can be configured to generate a pending low voltage notification signal in response to predicting a pending low voltage condition. In this manner, the supervisory system can notify processors or other systems or components that it is predicting that a low voltage condition will occur prior to the low voltage condition negatively affecting one or more of the systems or components. In such cases, one or more operational processors or other components can be configured to receive the pending low voltage notification signal and initiate a pending low voltage operation in response to receiving the pending low voltage notification signal. The low voltage operation can be defined based on any operation that may be beneficial for the processor or its processing function or implementation such that the process or system can take a precautionary measure in the event that the low voltage condition does occur, even if within very small periods of time, such as milliseconds. For example, a pending low voltage operation can include entering a suspension, sleep or idle mode, storing current parameters, storing a current status, state or profile, discontinuing control over a controlled power load, and discontinuing the providing of power from the power source to a power load controlled by the component.

In some embodiments, the supervisory system includes a voltage monitoring circuit for monitoring the level of the voltage of the power received from the power source. In other embodiments, such a monitoring can be provided by another component. The monitored voltage can be the voltage received by the supervisory module or processor or can be any other power received from the power source at any point within a power distribution system configured for delivering a portion of the power provided by the power source. For instance, in some embodiments this can be proximate to the output of the power source, proximate to the power input into a processor or another electronic component including a power load such as a motor or a regulator, by way of example. In such embodiments, a plurality of voltage monitoring sensors can be associated with various portions of the power distribution system with each generating a voltage signal indicative of the voltage associated with the monitored or sensed power.

In some embodiments, an electronic system can include a plurality of supervisory systems with each coupled to one or more of the plurality of processors. However, generally each processor will only interface and provide a status to one supervisory system, but possibly can be to two if the supervisory systems are paired, for example, if paired as fault tolerant supervisory modules. The supervisory systems can be configured to act independently with regard to any received status signal and status parameter and with regard to any components coupled thereto, such as one or more operational processors. Generally, an operational processor as described herein can include a processor within the electrical system for supervisory functions as described herein or for controlling a process or power load such as controlling a motor, an actuator, a fan, a pump, by way of example. One or more of these power loads can receive power from the same power source and can in some instances be the cause of the reduction or drop in the voltage level provided by the power source to one or more of the processors, power loads, and/or supervisory modules.

The supervisory system can be configured to become operational before the operational processors following an initial providing of power by the power source and following an increase in the voltage of the received power to being greater than the minimum supervisory voltage level following a reduction in the voltage level below the minimum supervisory voltage level. This can be accomplished by prioritizing the supervisory systems and processors, by adding a time delay to other processors, by waking up the supervisory processors at a lower voltage level, or by software implemented solutions including requiring the operational processors and/or subordinate supervisory processors to obtain a recovery or restart signal from another entity or supervisory system. One benefit of this type of auto-recovery is that the drain on the common power source can be optimized and managed so that further low voltage conditions can be minimized and are not initiated as a result of all of the systems and processors attempted to recover at the same time or in the wrong state.

The system can also include one or more status lines coupled between the supervisory system and one or more operational or other supervisory processors and between various system level components, by way of example. Each status line can be configured to provide a status associated with a status parameter of the system, a process, a component, and a processor, by way of example.

As noted, the supervisory system is configured for predicting a pending low voltage condition. The prediction can be done by any known method and are described by way of example in relation to FIGS. 2 and 3 below.

In some embodiments, the supervisory system is configured for storing one or more status parameters in response to a change in a status parameter, or the prediction of a pending low voltage condition, by way of example. In some embodiments, the status signals are continuously monitored and stored and any changes are automatically updated to the stored data, but can also include retaining prior snapshots of data. In this manner, the supervisory system can revert back to the latest stored parameters, and if there is a problem such as corrupt data due to the low voltage condition, can step back to yet another set of stored parameters, until a valid set of status parameters can be used to reestablish all processors and components within the system to as near as possible to the pre-low voltage conditions.

As described, some embodiments provide for a system stabilization before, during and following a low voltage condition that would otherwise provide for significant operational problems, increased rebooting intervals, potential negative effects of rebooting to inconsistent and sometimes inaccurate conditions and statuses. As such, various embodiments as described herein can prevent inappropriate processes and provide for the recovery of key system components, by automatically restarting and recovering in a organized and beneficial manner.

One exemplary embodiment of such a system is illustrated in FIG. 1. An electronic system 100 having a plurality of processors and a plurality of supervisory systems. As shown, a power supply 101 providing power over a power distribution facility 112 is shared by two supervisory systems or modules 102A and 102B (generally referred to as supervisory systems or modules 102), power controllers 106A and 106B (generally referred to as power controllers 106) and operational processors 104A–C (generally referred to as operational processors 104). Operational processors 104 control the operation of an associated power controller 106 as noted by the dashed control lines 110A and 110B, respectively. Each power controller 106 manages the supply of power to its individual power load 108A and 108B (generally referred to as power load 108).

Communication among supervisory systems 102 and operational processor 104C is achieved by the exchange of system status signals 115A and 115B (hereinafter generally as 115). Supervisory systems 102A and 102B, each have their own supervisory processor (not shown) that can provide their status signals through a status signal interface. Each operational processor 104 and/or supervisory system 102 can be configured to include a status input/output (I/O) for a status line that can include a status condition of being ON, OFF or in STANDBY. As a multiple processor system, each processor has its own management and control responsibilities and a given processor—processor relationship may include a master-slave arrangement, as illustrated by the relationship of supervisory system 102A and operational processor 104A, where the processor of the supervisory system 102A functions as a master processor for operational processor 104A. A similar arrangement is shown for supervisory system 102B and its associated operational processor 104B. Each supervisory system 102 and operational processor 104 arrangement or combination can provide for the communication of one or more status signals 114 including one or more status parameters between the two or more entities. The operational processor 104C functions as a stand-alone processor in this embodiment, but can receive communication from the system status signals 115. The supervisory systems 102 can have operational knowledge of each other via system status signals 115.

Any processor system typically has a minimum operating voltage at which the processor can properly function and continue to receive and process input data and output data and status signals. This minimum threshold voltage is characterized as a system shutdown voltage level, the level at which the processor no longer properly functions. The supervisory system 102 and its processor and components thereof has a lower shutdown voltage, referred to as the supervisor shutdown voltage as compared to an operational processor 104. This permits the supervisory processor 102 to continue to function and perform processing even though the voltage provided over the power distribution facility 112 has dropped below the minimum processor operating voltage. As such, the supervisory processor 102 can store system or processor statuses, provide notifications to other systems, predict future events such as low voltage conditions, and generate recovery or restart signals with status parameters to one or more operational processors. While it is not required, the minimum supervisory voltage level can be greater than about zero (such as about one volt, about 1.2 volts, or about 0.5 volts, while being less than the operational processor minimum voltage levels. In this manner, in some embodiments a total loss of power or voltage will force the supervisory systems 102 to reboot which can be beneficial in some embodiments or processes to ensure that systems or all processors correctly recover after a power loss.

Status indicators between processors can include the processor's relationship as a master, a slave or a peer processor. Other status indicators can include a signal, a parameter value, a hierarchical position, a processing state, an on/off state, a turning on or turning off state, a position, and a profile, by way of example.

The supervisory system, which is monitoring the power source, can be configured to generate a pending low voltage notification signal in response to predicting a pending low voltage condition, wherein the operational processors 104 are configured for receiving the pending low voltage notification signal and for initiating a pending low voltage operation in response to receiving the pending low voltage notification signal. The pending low voltage operation response can include a suspend mode, a storing of current parameters, storing a current status, discontinuing control of power over a controlled power load and discontinuing the providing of power from the power source to a power load.

Supervisory systems 102 can be configured for predicting a pending low voltage condition in response to one or parameters that may include a signal level detection, minor and major level detection, progressive detection levels, integration of a voltage over time falling below a level, time duration of a voltage below a defined level, rate of change to a lower level, multiple deviations below a defined level and waveform detection, by way of example.

In another embodiment, a supervisory system for stabilizing an electronic system having a plurality of operational processors receiving power from a DC power source and a power load consuming a portion of the power from the power source and capable of reducing the voltage of the power received by the processors, the system including a supervisory processing module configured for performing supervisory operations including receiving a monitored voltage of the power received from the power source, predicting a low voltage condition of the power received from the power source, receiving one or more status signals including one or more status parameters of at least one of the electronic system and a processor within the electronic system, storing the one or more received status parameters, identifying an operating voltage recovery condition indicated by an increase in the monitored voltage level being greater than a minimum operational processor voltage level following the detection of the low voltage condition, and transmitting to each of one or more operational processors a recovery signal including one or more of the stored status parameters in response to identifying the operating voltage recovery condition, the low voltage condition defined as a voltage level less than the minimum operational processor voltage level.

In some embodiments, the supervisory module can include a supervisory processor, a voltage detection circuit, computer readable medium such as a memory that includes computer executable instructions for performing one or more of the supervisory operations and a status signal interface. The voltage detection circuit is coupled to the supervisory processor and configured for monitoring a level of the voltage of the power received from the power source. The status signal interface is also coupled to the supervisory processor and is configured for receiving status signals. The memory can also be coupled to the supervisory processor for storing the status parameters. The supervisory module can also include a clock such that the processor is configured for transmitting the recovery signal is in response to a lapse of a predetermined time period.

As noted above, the supervisory processing module can be configured for performing the supervisory operations when the voltage received from the power source is greater than a minimum supervisory voltage level. The minimum supervisory voltage level can be less than the processor minimum operating voltage level. For example, in one embodiment the minimum operational processor voltage level can be about 5 volts DC and the minimum supervisory voltage level can be about 1.2 volts DC. Of course as known to those skilled in the art, these values can change. For example, the supervisory minimum voltage is selected from the group consisting of slightly greater than zero volts, about one half of a volt, about one volt, and about 1.2 volts and the minimum processor operating level can range greatly. Additionally, the power source can be a DC power storage device such as a battery or a fuel cell, that provides 6 volts, 12 volts, 18 volts, 24 volts, or 48 volts, by way of example, to the processors, the supervisory module, and one or more power loads. In some cases, the electronic system can also include a voltage regulator or other device that can provide one or more subordinate voltages or power levels from the power provided directly by the power source. The discussions herein with regard to the received power from the power load and the voltages thereof include any such derived secondary power.

In some embodiments, the supervisory processing module can be configured for generating a status signal including a supervisory processing module status parameter such that a second supervisory processing module receives the status signal and parameter associated with the first supervisory module. Each supervisory processing module can also be configured for generating a system status signal including a status parameter of the electronic system or one or more other components thereof. This can include having the supervisory processing module establishing one or more system status parameters based on its knowledge or functions and can include such established system status parameters in the generated system status signal.

Figure 2:
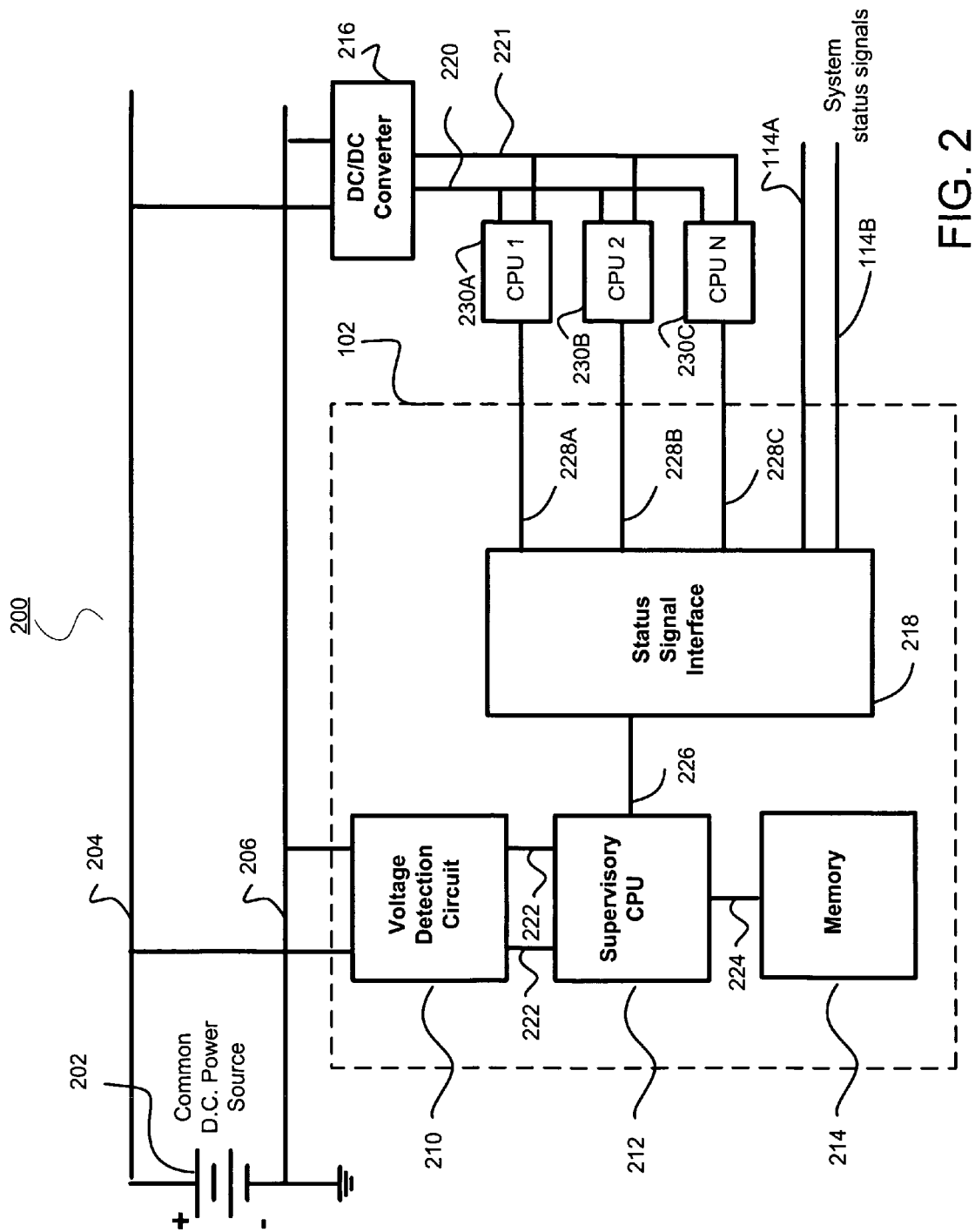
FIG. 2 is a block diagram of a supervisory system for a multi-processor power management system according to one exemplary embodiment.

Referring now to FIG. 2, one exemplary embodiment of a supervisory system 102 for a multi-processor power control system is illustrated showing exemplary functional blocks. A DC power source 202 is shown as a battery with power lines 204 and 206. The supervisory system 102 includes a voltage detection circuit 210, a supervisory processor 212, a memory 214, a DC to DC voltage converter 216, and a status signal interface 218.

The voltage detection circuit 210 can be configured to receive and sense the power from lines 204 and 206 and interfaces to the supervisory processor 212 via interfaces 222. The supervisory processor 212 is configured to interface to memory 214 via interface 224 and the status signal interface 218 via interface 226. Operational processors 230A–C (generally referred to as operational processors 230) can be configured to provide status indicators to the status signal interface 218 via interfaces 228A–C, respectively. The system status signals 115 and or operating processor status signals 114 are received by and transmitted by the supervisory processor 212.

In an alternative embodiment, the voltage detection circuit 210 can be configured to detect a voltage level after the DC—DC voltage converter 216 such as the voltages of 220 and 221. This might be the case wherein the DC power source provides a significantly higher voltage than required by the operational processors 230.

As noted above, the supervisory processing module can also be configured for generating a pending low voltage notification signal to the one or more operational processors in response to predicting the low voltage condition. This particular functionality can provide for significant improvements to system operations and recovery thereof.

The prediction generally include a future event such that the storing and/or notifying can be performed upon the predication but before the voltage level actually drops below the minimum operational processor voltage level. In this manner, the supervisory module and/or a notified processor or other system component can take action before the voltage drops to a level that can detrimentally affect the operation of the system. However, it should also be recognized that prediction can include the near simultaneous reduction in the voltage level below the minimum operational processor voltage level. In those embodiments, the lower operating voltage level of the supervisory system provides for the supervisory system to survive after the other operational processor become non-functional and the system saves or stores the various statuses to aid in a robust and near pre-failure state or condition of each processor and component within the system.

The supervisory prediction can be accomplished by any known method and are described by way of example in relation to FIGS. 2 and 3 below. and is typically a method that compares the current monitored voltage level with a history, function, or other values. For example, the prediction can include processes such as single level detection, minor and major level detection, progressive detection levels, integration voltage over time falling below a level, persistence below a defined level such a time duration persistence, rate of change to a lower level, multiple deviations below a defined level, and waveform detection. In addition, more sophisticated prediction algorithms may also be employed.

Figure 3:
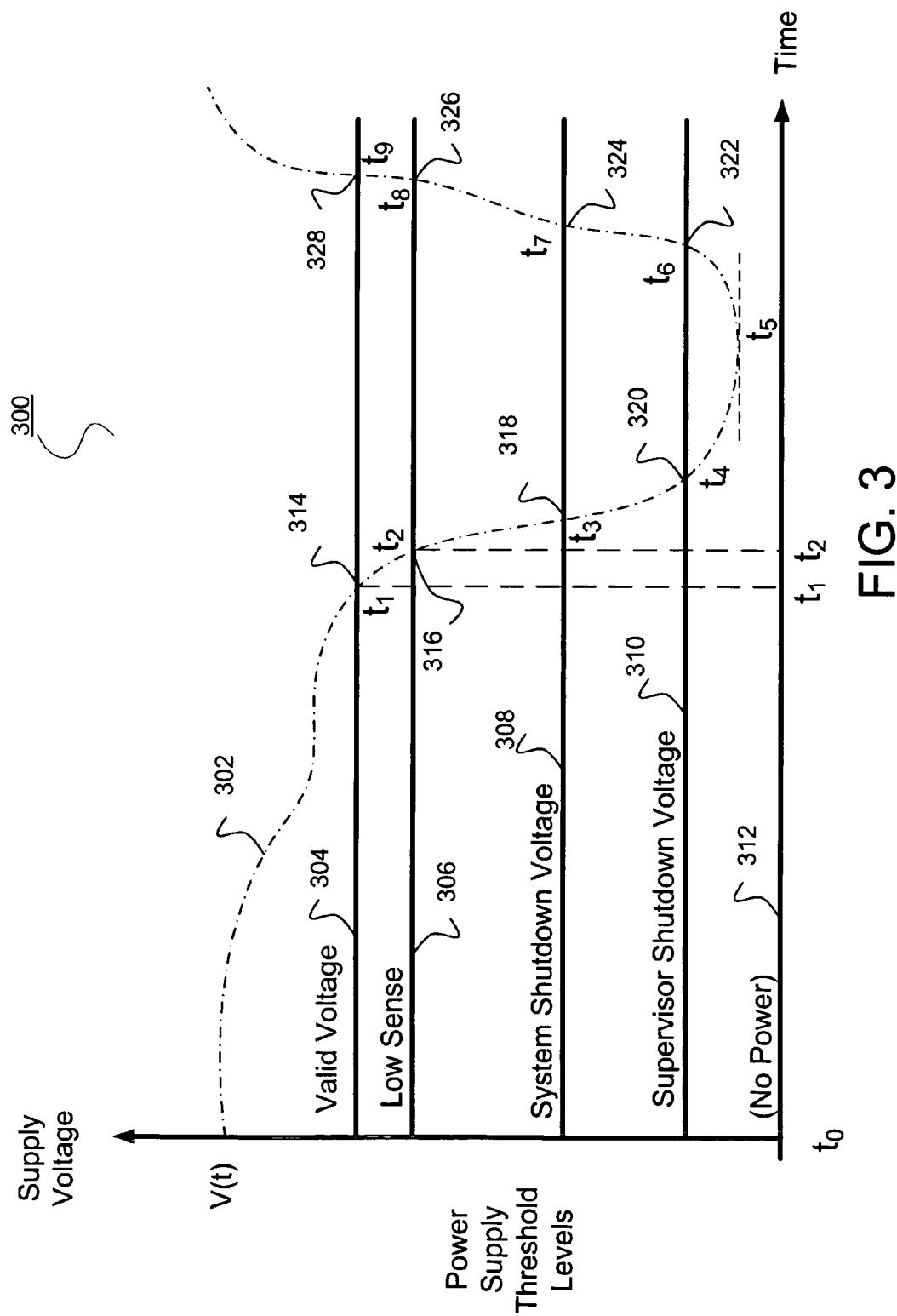
FIG. 3 is a graph illustrating the changing voltage delivered by a DC power source such as a battery when a voltage dropping power demand is received and the voltage thresholds for a supervisory system and an operational processor according to one exemplary embodiment.

FIG. 3 illustrates one exemplary embodiment of a processor functionality for predicting a low voltage condition. An exemplary time line 300 illustrates a varying power source voltage signal, 302 is illustrated as V(t), along with a set of predetermined voltage levels 304, 306, 308 and 310. In this example, the valid voltage level 304 is a predetermined voltage level at which the power source adequately furnishes power to all system components. At time, t1, the power source begins to experience a significant power demand and the voltage from the power source begins to sag. At time t2, the voltage level has deteriorated to a predetermined low sense voltage level and serves to indicate further power source degradation and can serve as an early warning indicator. At time t3, the power source level has deteriorated to the point that it has reached the operation processor shutdown voltage level, at which point the operational processor no longer functions properly. At time t4, the power source voltage has declined to the point that it reaches the minimum supervisory processor voltage level.

Since the minimum supervisory voltage level is lower than that of the operational processor shutdown voltage (or referred elsewhere as the minimum operational processor voltage level), the supervisory processor continues to function and continues monitoring the system voltages and perform the other supervisory tasks as described elsewhere. During the interval of time defined by t4–t3, the supervisory processor continues to function while the operational processors become inoperative, such as being idle or in a standby state.

In this example, the power source voltage continues to decline until t5 and then begins to recover, reaching the minimum supervisory processor voltage level at time t6. During the interval defined by t6–t4, all processors are shutdown and inoperable. After time t6, the supervisory processor becomes functional and recovers and can access the stored status parameters in memory 214 and generate a recovery signal including the stored status parameters. At time t7, the power source has recovered to the level that the operational processors can function and thus receive their status signals with status parameters from the supervisory processor 212. During the interval defined by t7–t6, the supervisory processor 212 can process stored data and transmit the data to the operational processors beginning after time t7. At time t8, the voltage level has recovered to the low sense level and at time t9, the power source has recovered to the valid voltage level 304.

As known to those skilled in the art, the time series of voltage measurement data illustrated in FIG. 3 can be saved in memory 214 and used to calculate control algorithms and initiate control actions between the supervisory CPU and its managed functional blocks. Such measurements can be used to predict further system degradation and initiate control actions, as well as predict a full power source recovery time estimate.

In operation, one embodiment includes a method of controlling multiple processors in an electronic system wherein each of the multiple processors receiving operating power from a DC power source includes monitoring a voltage received from the power source, predicting a reduction of the voltage to a level less than a predetermined value before the voltage equals the predetermined value, and storing a status parameter associated with at least one of status of one or more of the processors and a status of the system. The method also includes monitoring the voltage received from the power source following a reduction of the received power source voltage to a level less than the first predetermined value, detecting an increase in the voltage received from the power source to a level greater than the first predetermined value, and transmitting a recovery signal to each of the one or more of the multiple processors, each recovery signal including one or more of the stored status parameters.

Figure 4:
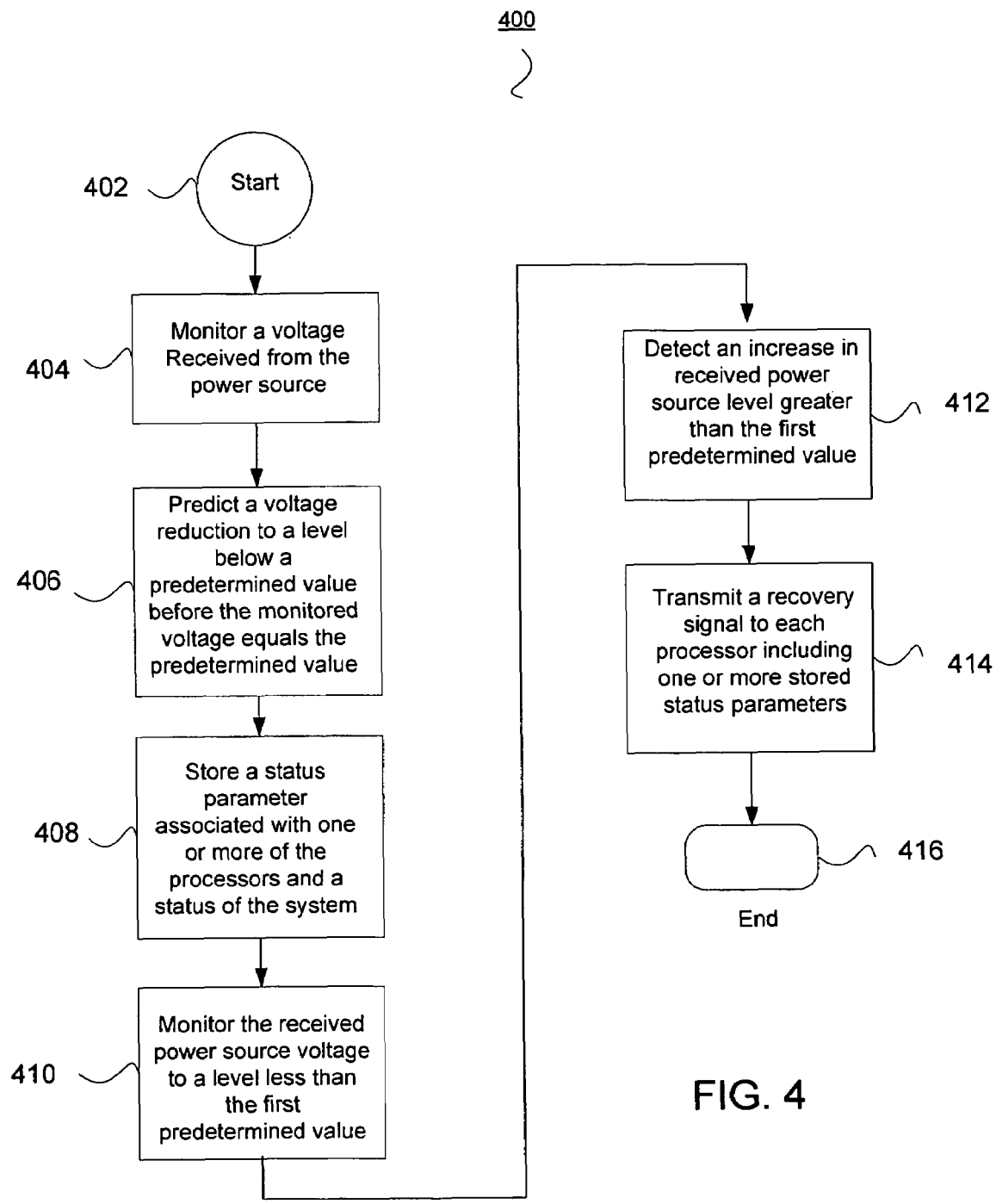
FIG. 4 is block diagram of a method for managing the restoring of power to processors before, during and after a low voltage condition according to one exemplary embodiment.

Referring to FIG. 4, a flow chart illustrates a method of controlling multiple processors in an electronic system, wherein each of the processors receives its power from a DC power source is illustrated in one embodiment. The method begins in process 402 and the voltage is monitored as received from a power source in process 404. The monitored/sampled voltages are used in process 406 to predict when the voltage reduction will fall below a predetermined value, e.g., a pending low voltage condition. For example, a predicted value can be set to a level that will be reached before the monitored voltage equals the predetermined value (such as the predetermined minimum operating process voltage level), thereby providing a margin for the predicting. In such a case, the supervisory processor can store a status parameter associated with one or more of the processors and a status of the system in process 408. In process 410, the supervisory processor continues to monitor the received power source voltage to a level that is less than the first predetermined value. When the supervisory processor detects an increase in the received power source level that is greater than the first predetermined value in process 412, the power source has recovered and a recovery signal is transmitted to each processor in process 414, including one or more status parameters that were stored in process 408, to facilitate a more rapid or improved recovery of the operational processors, thus, completing the controlled operational system CPU shutdown and/or recovery process of process 416.

In some embodiments, the method can include storing one or more status parameters in response to at least one of a change in a status parameter as received by the status signal interface and the predicting of a reduction in the voltage.

Additionally, as also described above, the method can include notifying the one or more of the multiple processors of a predicted low voltage condition in response to the predicted voltage reduction before the voltage equals the predetermined value. In such cases, an operational processor or other system component can initiate a low voltage mode or action upon receipt of the notification that a low voltage condition has been predicted. While in some cases, a low voltage condition does not occur following the notification, the action taken can help to ensure that the low voltage condition does not occur. For example, a processor controlling a fan or motor can reduce the power provided to the fan or motor or can terminate the power provided thereto in response to receiving the notification of a pending low voltage condition. By reducing or terminating the power to such power consuming devices in advance of the low voltage condition, the low voltage condition may be avoided in some cases, or at least the impact or duration can be reduced.

In another embodiment when the low voltage condition actually occurs, the method can provide for receiving a transmitted recovery signal by one or more of the processors, and entering a reactivate mode by the one processor upon receiving the recovery signal. In such cases, the recovery signal can include one or more status parameters such that each processor can recover based on a prior status, such as directly preceding the low voltage condition or the prediction of the low voltage condition, or to another status as dictated by the supervisory system or as provided in the system status signals.

In some embodiments, a method also provides for discontinuing monitoring the voltage following a reduction of the received power source voltage when the received power source voltage is less than or equal to a second predetermined value, the second predetermined value being less than the first predetermined value. This can also include detecting a voltage received from the power source greater than the second predetermined value following the discontinuing of monitoring the voltage, and transmitting the recovery signal to each of the one or more of the multiple processors, each recovery signal including an indicator of the prior reduction in voltage received from the power source being less than the second predetermined value.

The method can also include determining a status parameter for the system or various components thereof, generating a system status signal including the system status parameter; and transmitting the system status signal over a communication facility. This communication facility can be a common facility such as a bus on which various system components communicate their statuses, as well as other operational data. As noted above, the supervisory system can also be configured for establishing a system status parameter or a processor or other system status parameter, generating one or more status signals including a system status signal having the system status parameter that it established, and transmitting the system status signal over a system status communication facility.

Figure 5:
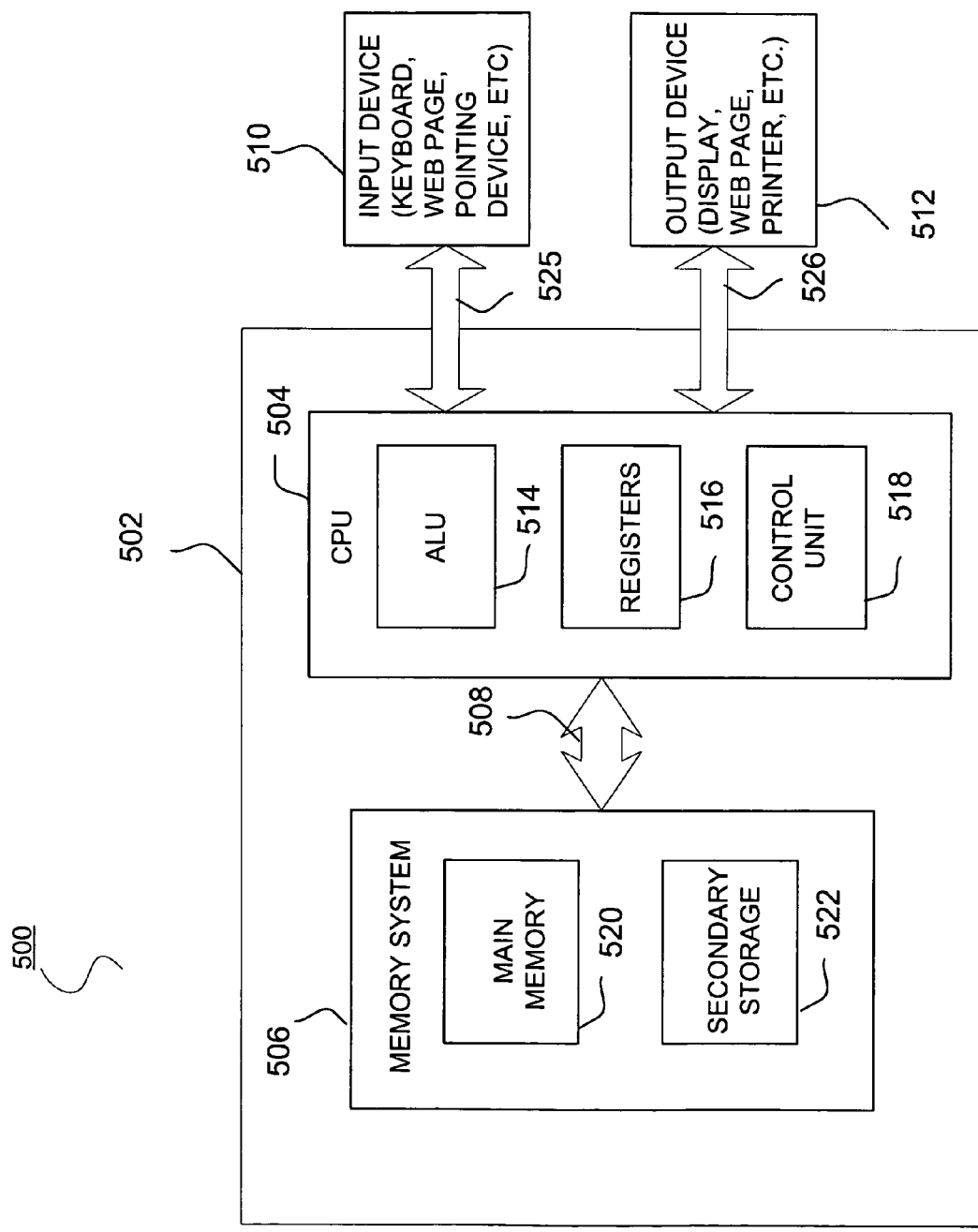
FIG. 5 is a block diagram of a computer system and environment for one or more components of supervisory system as described herein and as in accordance with one exemplary embodiment.

Referring now to FIG. 5, a computer/processing system for one or more exemplary embodiments of the operating or operational processor, the electronic system and/or the supervisory system or module, can include a computer or processing system 500 having a computer 502 that comprises at least one high speed processing unit (CPU) 504, in conjunction with a memory system 506 interconnected with at least one bus structure 508, an input device 510, and an output device 512. These elements are interconnected by at least one bus structure 508. One or more of the processors or supervisory processors or modules or systems can be located on one or more circuit boards (not shown).

The illustrated CPU 504 is of familiar design and includes an arithmetic logic unit (ALU) 514 for performing computations, a collection of registers 516 for temporary storage of data and instructions, and a control unit 518 for controlling operation of the system 500. Any of a variety of processor, including at least those from Digital Equipment, Sun, MIPS, Freescale (Motorola), NEC, Intel, Cyrix, AMD, HP, and Nexgen, is equally preferred for the CPU 504. The illustrated embodiment of the invention operates on an operating system designed to be portable to any of these processing platforms.

The memory system 506 generally includes high-speed main memory 520 in the form of a medium such as random access memory (RAM) and read only memory (ROM) semiconductor devices, and secondary storage 522 in the form of long term storage mediums such as floppy disks, hard disks, tape, CD-ROM, flash memory, etc. and other devices that store data using electrical, magnetic, optical or other recording media. The main memory 520 also can include video display memory for displaying images through a display device. Those skilled in the art will recognize that the memory system 506 can comprise a variety of alternative components having a variety of storage capacities.

The input device 510 and output device 512 are also familiar and can be implemented associated with the local and remote user interfaces as well as a controller, remote operational system and operations system, by way of example. The input device 510 can comprise a keyboard, a mouse, a physical transducer (e.g. a microphone), etc. and is interconnected to the computer 502 via an input interface 524. The output device 512 can comprise a display, a printer, a transducer (e.g. a speaker), etc, and be interconnected to the computer 502 via an output interface 526. Some devices, such as a network adapter or a modem, can be used as input and/or output devices.

As is familiar to those skilled in the art, the computer system 500 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 506. As known to those skilled in the art, some of the methods, processes, and/or functions described herein can be implemented as software and stored on various types of computer readable medium as computer executable instructions. In various embodiments of the power control system described by example herein, the controller can include a robust operating and application program having the computer executable instructions for controlling the controller and the controlled devices. Additionally, one or more of the local and remote user interfaces, operations system and remote operations system can include, among other application software programs with computer executable instructions, a thin client application for communicating and interactively operating with one or more controllers as described above by way of example.

In accordance with the practices of persons skilled in the art of computer programming, the present invention is described below with reference to symbolic representations of operations that are performed by the computer system 500. Such operations are sometimes referred to as being computer-executed. It will be appreciated that the operations which are symbolically represented include the manipulation by the CPU 504 of electrical signals representing data bits and the maintenance of data bits at memory locations in the memory system 506, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system 506.

It should be understood to those skilled in the art, that some embodiments of systems or components described herein may have more or fewer computer processing system components and still be within the scope of the present invention.

When describing elements or features of the present disclosure or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A supervisory system for stabilizing an electronic system having a plurality of operational processors receiving power from a DC power source and a power load consuming a portion of the power from the power source and capable of reducing the voltage of the power received by the processors, the system comprising:

a supervisory processing module configured for performing supervisory operations including receiving a monitored voltage of the power received from the power source, predicting a low voltage condition of the power received from the power source, receiving one or more status signals including one or more status parameters of at least one of the electronic system and a processor within the electronic system, storing the one or more received status parameters, identifying an operating voltage recovery condition indicated by an increase in the monitored voltage level being greater than a minimum operational processor voltage level following the detection of the low voltage condition, and transmitting to each of one or more operational processors a recovery signal including one or more of the stored status parameters in response to identifying the operating voltage recovery condition, the low voltage condition defined as a voltage level less than the minimum operational processor voltage level.

2. The system of claim 1 wherein the supervising processing module includes a supervisory processor, a voltage detection circuit coupled to the supervisory processor and configured for monitoring a level of the voltage of the power received from the power source, a status signal interface coupled to the supervisory processor and configured for receiving status signals, and a memory couple to the supervisory processor for storing the status parameters.

3. The system of claim 1 wherein the supervisory processing module is configured for performing the supervisory operations when the voltage received from the power source is greater than a minimum supervisory voltage level and wherein the minimum supervisory voltage level is less than the processor minimum operating voltage level.

4. The system of claim 1 wherein the minimum operational processor voltage level is about 5 volts DC and the minimum supervisory voltage level is about 1.2 volts DC.

5. The system of claim 1 wherein the power source is a power storage device selected from the group consisting of a battery and a fuel cell.

6. The system of claim 1 wherein the supervisory processing module is configured for generating a pending low voltage notification signal to the one or more operational processors in response to predicting the low voltage condition.

7. The system of claim 6 wherein at least one of the operational processors is a master processor and at least one of the operational processors is a slave processor, wherein each master processor and the slave processor generates a status signal including an indication of at least one of a master processor and a slave processor, and wherein the status signal interface is configured for receiving a status signal from each master processor and each slave processor.

8. The system of claim 1, further comprising a clock wherein the processor is configured for transmitting the recovery signal is in response to a lapse of a predetermined time period.

9. The system of claim 1 wherein the supervisory minimum voltage is selected from the group consisting of about zero volts, about one volt, and about 1.2 volts.

10. The system of claim 1 wherein the status is selected from the group consisting of a master, a slave, a peer, a signal, a parameter value, a hierarchical position, a processing state, an on/off state, a turning on or turning off state, a position, and a profile.

11. The system of claim 1 wherein the processor is configured for predicting a low voltage condition in response one or more selected from the group consisting of single level detection, minor and major level detection, progressive detection levels, integration voltage over time falling below a level, time duration persistence below a defined level, rate of change to a lower level, multiple deviations below a defined level, and waveform detection.

12. The system of claim 1 wherein the supervisory processing module is configured for generating a status signal including a supervisory processing module status parameter, and wherein the supervisory processing module is configured for receiving a status signal including a supervisory processing module status parameter from a second supervisory processing module.

13. The system of claim 1 wherein the supervisory processing module is configured for storing one or more status parameters in response to at least one of a change status parameter as received in a status signal and the prediction of a low voltage condition.

14. The system of claim 1 wherein the supervisory processing module is configured for generating a system status signal including a status parameter of the electronic system and wherein the status signal interface is configured for transmitting the generated system status signal.

15. The system of claim 1 wherein the supervisory processing module is configured for establishing the system status parameter for inclusion in the generated system status signal.

16. A system for controlling multiple processors in an electronic system having a DC power source for providing DC power to the processors and to power loads within the electronic system, the system comprising:
a plurality of processors, each configured for performing an operation associated with the electronic system and receiving a portion of the power provided by the power source, each processor being configured for performing the operation and for generating a status signal with a status parameter indicative of a status of the processor when the voltage of the receiving power is greater than a minimal operational processor voltage level; and
a supervisory system configured for receiving a portion of the power provided by the power source and receiving a system status signal including a system status parameter, and for performing a supervisory operation including monitoring a level of the voltage of the received power, receiving the status signal from one or more of the processors, predicting a pending low voltage condition having a voltage level equal to or less than the minimal operational processor voltage level, storing one or more received status parameters, detecting a low voltage condition having a received voltage equal to or less than the minimal operational processor voltage level, detecting a voltage level greater than the minimal operational processor voltage level following the detection of the low voltage condition, and transmitting to one or more operational processors a recovery signal including at least one of one or more stored status parameters and a system status parameter in response to the detected voltage level being greater than the minimal operational processor voltage level,
wherein the supervisory system is configured for performing the supervisory operations when the voltage received from the power source is greater than or equal to a minimum supervisory voltage level and wherein the minimum supervisory voltage level is less than the minimal operational processor voltage level.

17. The system of claim 16 wherein the supervisory system is configured for generating a pending low voltage notification signal in response to predicting a pending low voltage condition and wherein one or more of the processors are operational processors configured for receiving the pending low voltage notification signal and for initiating a pending low voltage operation in response to receiving the pending low voltage notification signal.

18. The system of claim 17 wherein the pending low voltage operation includes one or more selected from the group consisting of a suspend mode, storing current parameters, storing a current status, discontinuing control over a controlled power load, and discontinuing the providing of power from the power source to a power load.

19. The system of claim 16 wherein the supervisory system includes a voltage monitoring circuit for monitoring the level of the voltage of the power received from the power source, further comprising a plurality of voltage monitoring sensors, wherein each of the voltage monitoring sensors generates a voltage signal indicative of the voltage associated with the power received from a different one of the processors, wherein the voltage monitoring circuit is configured to receive one or more voltage signals, and wherein the supervisory system is configured to predicted the future low voltage condition in response to one or more received voltage signals.

20. The system of claim 16, further comprising a plurality of supervisory systems, each being coupled to one or more of the plurality of processors and each being configured for receiving the system status signal including the system status parameter.

21. The system of claim 16 wherein one or more of the processors is an operational processor configured for controlling the receiving of a portion of the power from the power source power by an operational power load in the electrical system.

22. The system of claim 21 wherein each processor is configured for generating a status signal on at least one of a continuous basis and a periodic basis.

23. The system of claim 21 wherein the supervisory system is configured to become in a functional state before the operational processors following an initial providing of power by the power source and following an increase in the voltage of the received power to being greater than the minimum supervisory voltage level following a reduction in the voltage level below the minimum supervisory voltage level.

24. The system of claim 16, further comprising one or more status lines coupled between the supervisory system and one or more processors, each status line configured to provide a status associated with a status parameter of the system.

25. The system of claim 16 wherein the supervisory system is configured for storing one or more status parameters in response to at least one of a change status parameter as received by the status signal interface in a status signal and the prediction of a low voltage condition.

26. The system of claim 16 wherein the supervisory system is configured for establishing a system status parameter, generating a system status signal including the system status parameter, and transmitting the system status signal over a system status communication facility.

27. A system for managing an electronic system having a DC power source providing power to a plurality of operational processors, at least one supervisory system including a supervisory processor, and power loads, the system comprising:

means for predicting a low voltage condition, the low voltage condition being when the voltage of the received power from the supply power is equal to or less than a predetermined value;

means for receiving a status signal including a status parameter associated with a status of at least one of the electronic system, one or more operational processors, and one or more supervisory processors;

means for storing by each supervisory system one or more received status parameters;

means for operating each of the supervisory systems following a reduction of voltage received from the power source of equal to or less than the predetermined value;

means for detecting the voltage received from the power source is greater than the predetermined value following the low voltage condition; and means for restarting each of the operational processors in response to the detecting of the voltage from the power source being greater than the predetermined value by the means for detecting, wherein restarting includes restarting each operational processor in response to one or more stored status parameters.

28. The system of claim 27, further comprising means for monitoring a voltage of the power received from a power source.

29. The system of claim 27, further comprising means for obtaining the status of each of the processors receiving power from the power source, wherein the means for storing a status is in response the status obtained by the means for obtaining and in response predicting a low voltage condition by the means for predicting.

30. The system of claim 27 wherein the predetermined value is a first predetermined value, further comprising means for discontinuing the operating of the supervisory system following the reduction of voltage received from the power source being less than a second predetermined level, the second predetermined level being greater than supervisory minimum voltage and less than the first predetermined level.

31. The system of claim 27, further comprising means for notifying one or more of the processors of the predicting of a pending low voltage condition.

32. The system of claim 31, further comprising means for placing the one or more processors in a low voltage mode in response to a notification from the means for notifying.

33. The system of claim 27 wherein the means for restarting includes means for transmitting a recovery signal to each processor, the recovery signal including one or more stored status parameters.

34. The system of claim 27, further comprising:

means for determining a status parameter for the system;

means for generating a system status signal including the system status parameter; and means for transmitting the system status signal over a communication facility.

* * * * *